(12) United States Patent
Jaskot et al.

(10) Patent No.: US 10,974,555 B1
(45) Date of Patent: Apr. 13, 2021

(54) TRAILER INCLUDING ARTICULATING TRAILER TONGUE

(71) Applicant: International Automated Systems, Inc., Blaine, MN (US)

(72) Inventors: Jason Jaskot, Baldwin, WI (US); William D. Britz, Winchester, VA (US)

(73) Assignee: International Automated Systems, Inc., Blaine, MN (US)

( * ) Notice: Subject to any disclaimer, the term of this patent is extended or adjusted under 35 U.S.C. 154(b) by 186 days.

(21) Appl. No.: 16/107,210

(22) Filed: Aug. 21, 2018

Related U.S. Application Data

(60) Provisional application No. 62/648,886, filed on Mar. 27, 2018.

(51) Int. Cl.
| | |
|---|---|
| B60D 1/46 | (2006.01) |
| B62D 63/06 | (2006.01) |
| B62D 63/08 | (2006.01) |
| B60D 1/54 | (2006.01) |
| B60D 1/04 | (2006.01) |
| B60D 1/64 | (2006.01) |
| B60P 7/08 | (2006.01) |
| B60R 9/02 | (2006.01) |
| B60G 3/00 | (2006.01) |

(52) U.S. Cl.
CPC .............. B60D 1/46 (2013.01); B60D 1/04 (2013.01); B60D 1/54 (2013.01); B60D 1/64 (2013.01); B60G 3/00 (2013.01); B60P 7/0823 (2013.01); B60R 9/02 (2013.01); B62D 63/062 (2013.01); B62D 63/068 (2013.01); B62D 63/08 (2013.01); *B60D 2001/544* (2013.01); *B60G 2200/10* (2013.01); *B60G 2300/04* (2013.01)

(58) Field of Classification Search
CPC ... B60D 1/04; B60D 1/46; B60D 1/54; B60D 1/64; B60D 2001/544; B60R 9/02; B62D 63/08; B62D 63/068; B62D 63/062; B60G 3/00; B60G 2200/10; B60G 2300/04; B60P 7/0823
USPC ........................................................ 280/422
See application file for complete search history.

(56) References Cited

U.S. PATENT DOCUMENTS

| | | | | |
|---|---|---|---|---|
| 5,306,037 A | * | 4/1994 | Robertson ................ | B60D 1/48 280/455.1 |
| 8,157,288 B2 | * | 4/2012 | Kapels .................... | B60D 1/06 280/416.1 |

(Continued)

*Primary Examiner* — Tony H Winner
*Assistant Examiner* — Felicia L. Brittman
(74) *Attorney, Agent, or Firm* — Suiter Swantz pc llo

(57) ABSTRACT

A trailer includes a trailer bed and a trailer tongue. The trailer bed includes a trailer frame, a body, a platform, and one or more sets of two or more wheels. The trailer tongue includes a tongue arm, a trailer hitch component coupled to the tongue arm, and one or more brackets coupled to the trailer frame via a bracket shaft. The trailer tongue is couplable to a vehicle hitch component. The trailer tongue is rotatable about an axis through the bracket shaft. The one or more brackets include one or more cut-outs configured to receive a locking component. The trailer tongue is securable via the locking component at a select angle relative to a ground surface. The trailer hitch component is positionable via the locking component at a select height relative to a height of the vehicle hitch component based on the angle relative to the ground surface.

19 Claims, 13 Drawing Sheets

(56) References Cited

U.S. PATENT DOCUMENTS

| | | | | |
|---|---|---|---|---|
| 2002/0190499 A1* | 12/2002 | Connor | ................... | B60D 1/46 |
| | | | | 280/491.2 |
| 2009/0045236 A1* | 2/2009 | Aurbeck | ................... | B60R 9/02 |
| | | | | 224/518 |
| 2014/0306425 A1* | 10/2014 | Atkinson | ............. | B60G 13/003 |
| | | | | 280/414.5 |

* cited by examiner

TRAILER INCLUDING ARTICULATING TRAILER TONGUE

CROSS-REFERENCE TO RELATED APPLICATIONS

The present application claims the benefit under 35 U.S.C. § 119(e) of U.S. Provisional Patent Application Ser. No. 62/648,886, filed Mar. 27, 2018, titled TRAILER CONFIGURED TO OPERATE WITH REDUCED EFFECT OF TONGUE WEIGHT ON TOWING CAPACITY OF A VEHICLE, naming Jason Jaskot as inventor, which is incorporated herein by reference in the entirety.

TECHNICAL FIELD

The present invention generally relates to trailers, and more particularly, to a trailer including an articulating trailer tongue.

BACKGROUND

Different types of trailer hitches are utilized when coupling a trailer to a vehicle. For example, the trailer may be coupled to the vehicle via a hitch positioned over (or just in front of) a rear axle such as a gooseneck, a fifth wheel hitch, or the like. By way of another example, the trailer may be coupled to the vehicle via a hitch positioned behind the rear axle such as a pintle hitch, a rear receiver hitch, a bumper hitch, a weight distribution hitch, or the like.

Vehicles are rated for a maximum tongue weight. Tongue weight is the downward force a trailer tongue exerts on a receiving component of a trailer hitch mounted on a vehicle. Tongue weight is determined based on how a trailer is loaded. If the tongue weight is too little (e.g., the weight distribution in/on the trailer is too far back), the back end of the vehicle may lift and cause trailer sway. If the tongue weight is too much (e.g., the weight distribution in/on the trailer is too far forward), the back end of the vehicle may sag and cause reduced handling, visibility, and/or effectiveness of vehicle brakes. The maximum tongue weight is generally less than the towing capacity of the vehicle, such that the towing capacity of the vehicle may not be fully and/or safely utilized.

Therefore, it would be advantageous to provide a system and method that cures the shortcomings described above.

SUMMARY

A trailer is described, in accordance with one or more embodiments of the present disclosure. In one embodiment, the trailer includes a trailer bed. In another embodiment, the trailer bed includes a trailer frame. In another embodiment, the trailer bed includes a body coupled to the trailer frame. In another embodiment, the trailer bed includes a platform coupled to the body. In another embodiment, the trailer bed includes one or more sets of two or more wheels. In another embodiment, the trailer includes a trailer tongue coupled to the trailer frame. In another embodiment, the trailer tongue includes a tongue arm. In another embodiment, the trailer tongue includes a trailer hitch component coupled to the tongue arm. In another embodiment, the hitch component of the trailer tongue is couplable to a vehicle hitch component. In another embodiment, the trailer tongue includes one or more brackets coupled to the trailer frame via a bracket shaft. In another embodiment, the trailer tongue is rotatable about an axis through the bracket shaft. In another embodiment, the one or more brackets include one or more cut-outs. In another embodiment, the one or more cut-outs are configured to receive a locking component. In another embodiment, the trailer tongue is securable via the locking component at a select angle relative to a ground surface. In another embodiment, the trailer hitch component is positionable via the locking component at a select height relative to a height of the vehicle hitch component based on the angle relative to the ground surface.

A zero-tongue-weight trailer tongue is disclosed, in accordance with one or more embodiments of the present disclosure. In one embodiment, the trailer tongue includes a tongue arm. In another embodiment, the trailer tongue includes a trailer hitch component coupled to the tongue arm. In another embodiment, the hitch component of the trailer tongue is couplable to a vehicle hitch component. In another embodiment, the trailer tongue includes one or more brackets coupled to the trailer frame via a bracket shaft. In another embodiment, the trailer tongue is rotatable about an axis through the bracket shaft. In another embodiment, the one or more brackets include one or more cut-outs. In another embodiment, the one or more cut-outs are configured to receive a locking component. In another embodiment, the trailer tongue is securable via the locking component at a select angle relative to a ground surface. In another embodiment, the trailer hitch component is positionable via the locking component at a select height relative to a height of the vehicle hitch component based on the angle relative to the ground surface.

BRIEF DESCRIPTION OF THE DRAWINGS

The numerous advantages of the present disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

FIGS. 1A-4D generally illustrate a trailer 100 including an articulating zero-tongue-weight tongue, in accordance with one or more embodiments of the present disclosure.

Embodiments of the present disclosure are directed to a trailer including an articulating trailer tongue, where the trailer tongue is configured for zero tongue weight. Embodiments of the present disclosure are also directed to hauling the trailer via a hitch coupled to a vehicle. Embodiments of the present disclosure are also directed to an articulatable trailer tongue, where a height of a hitch component coupled to the trailer tongue is configurable relative to a height of a hitch component coupled to the vehicle.

Figure 1A:
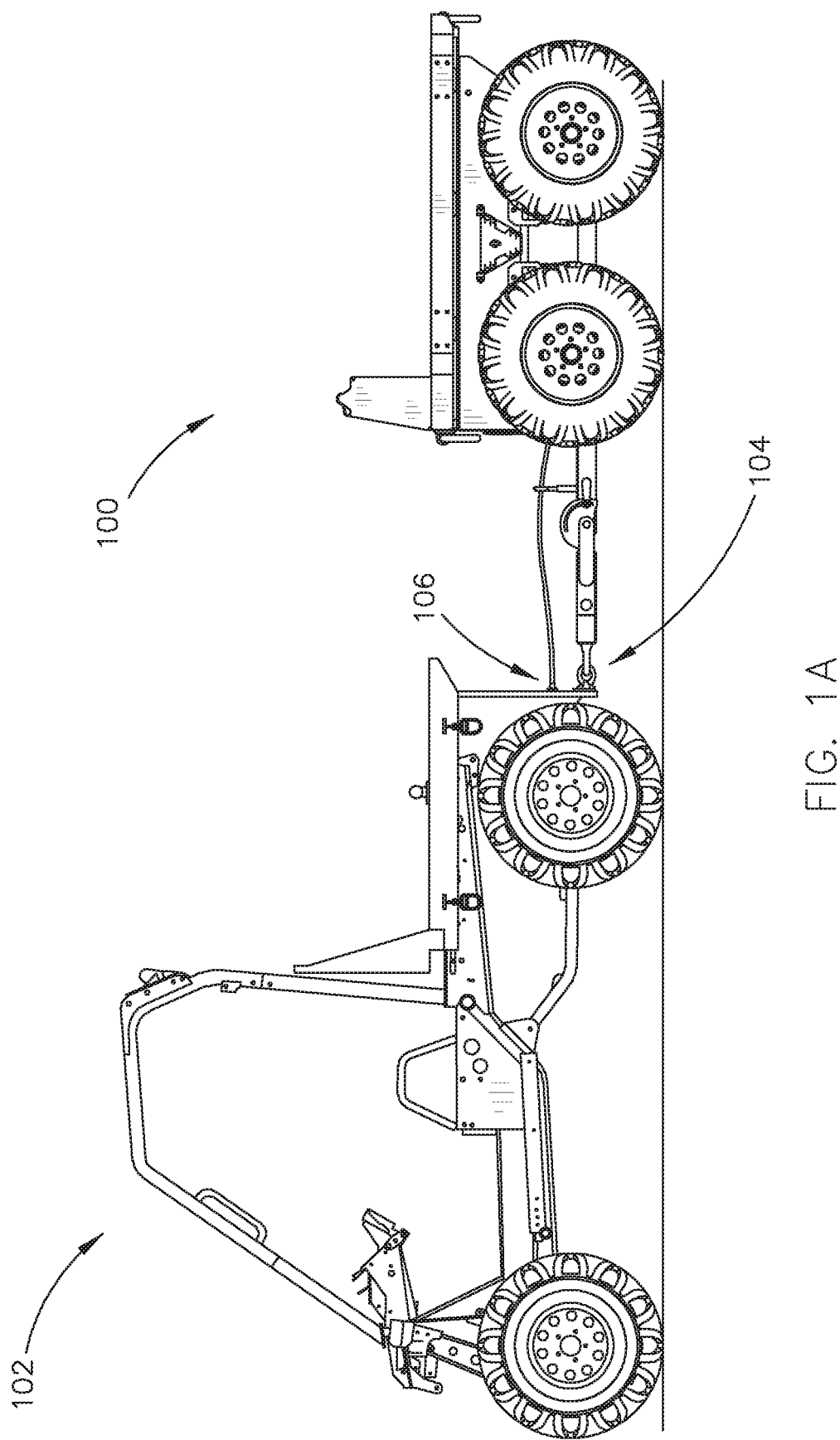
FIG. 1A illustrates a trailer including an articulating trailer tongue coupled to a vehicle, in accordance with one or more embodiments of the present disclosure.
Figure 1B:
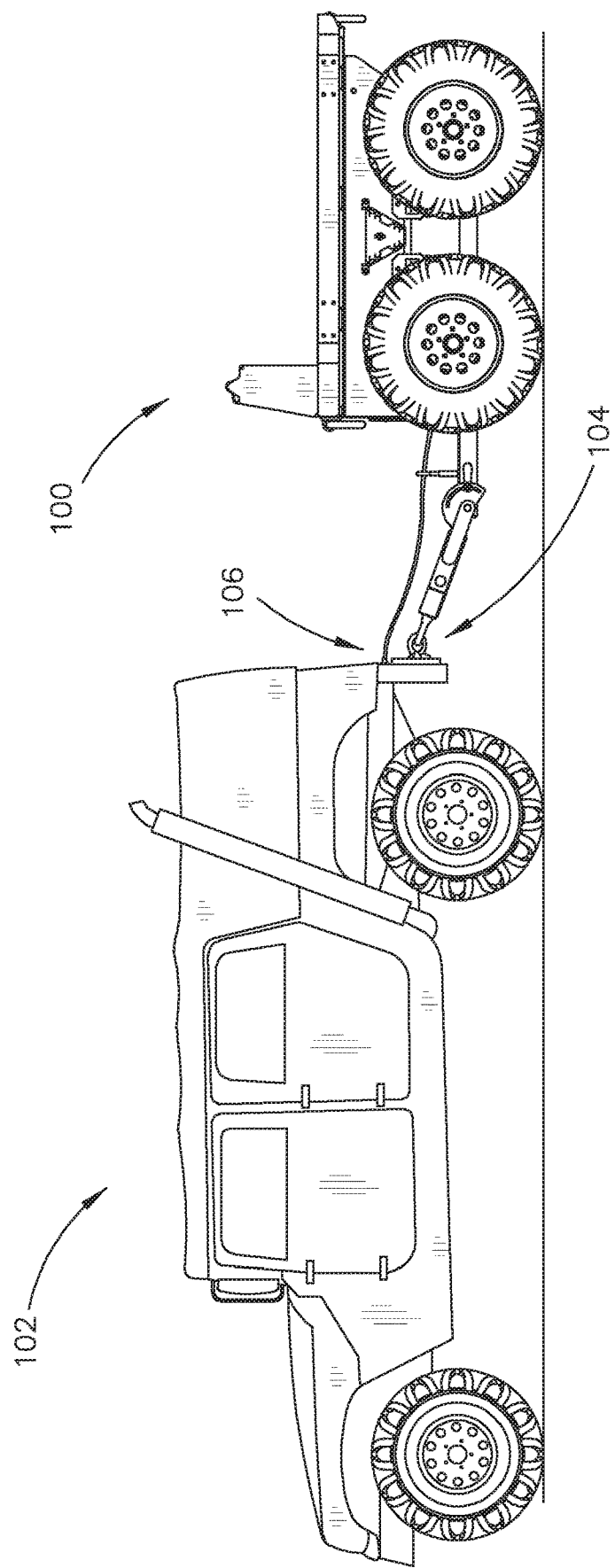
FIG. 1B illustrates a trailer including an articulating trailer tongue coupled to a vehicle, in accordance with one or more embodiments of the present disclosure.
Figure 2A:
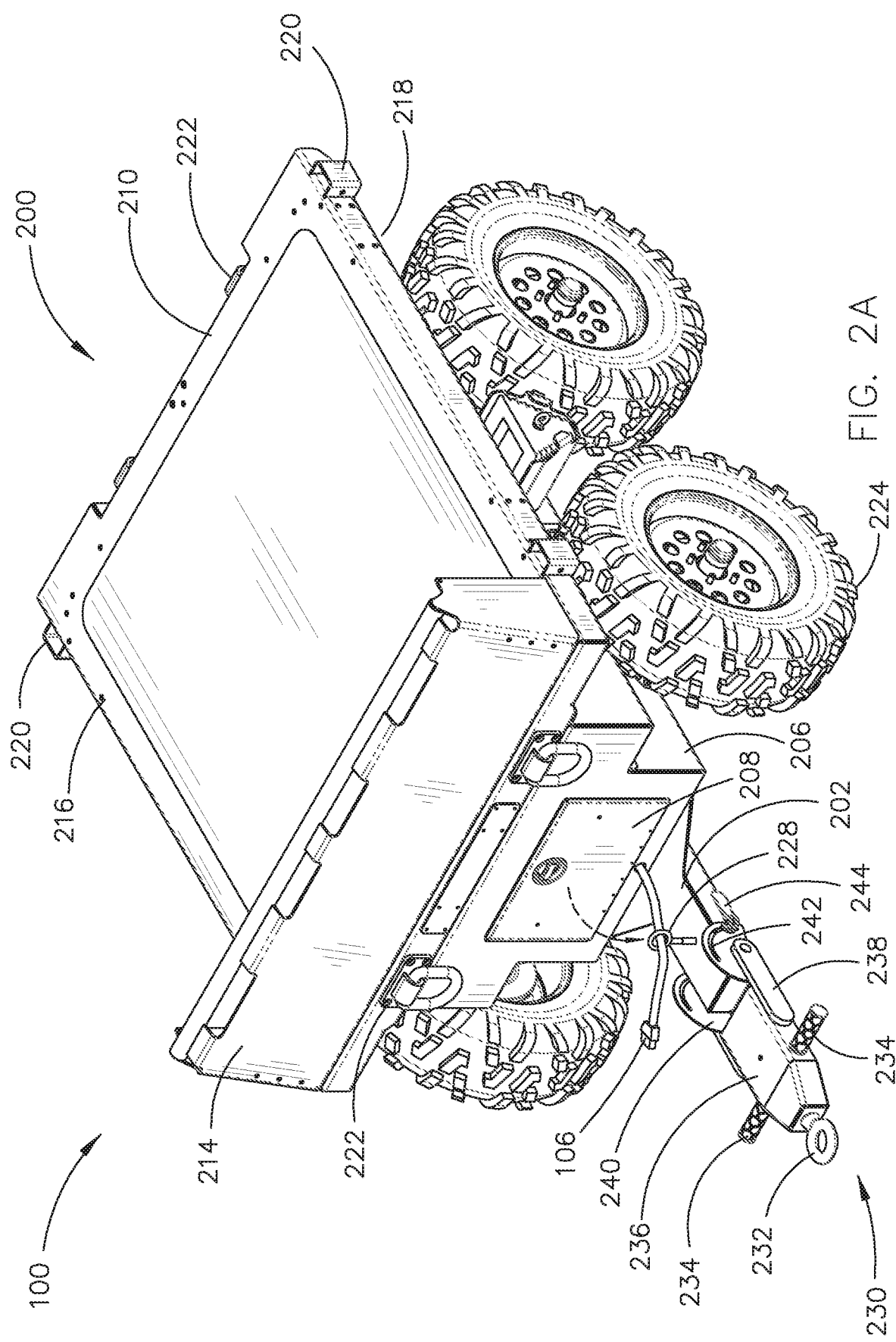
FIG. 2A illustrates a perspective view of a trailer including an articulating trailer tongue, in accordance with one or more embodiments of the present disclosure.
Figure 2B:
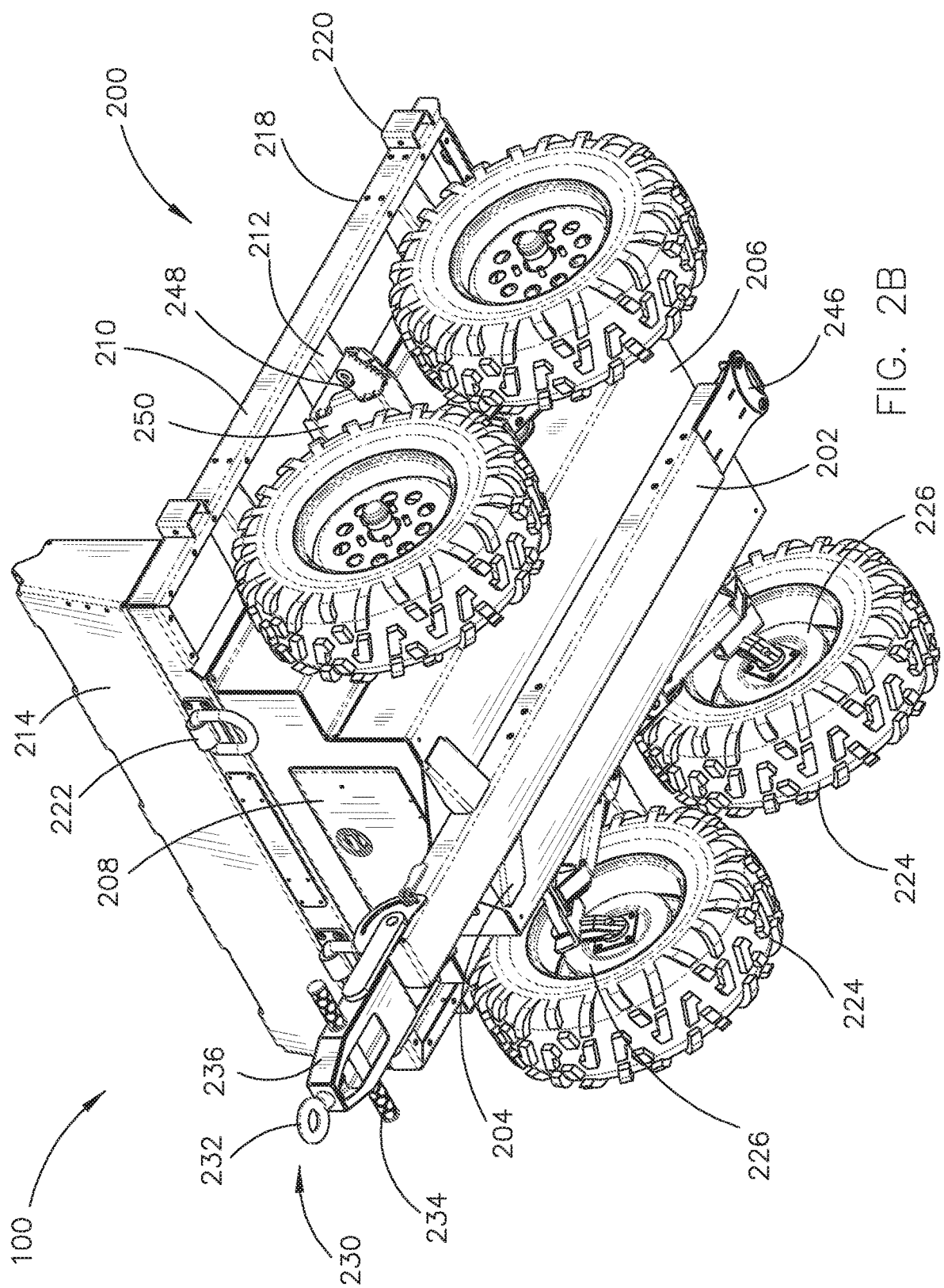
FIG. 2B illustrates a perspective view of a trailer including an articulating trailer tongue, in accordance with one or more embodiments of the present disclosure.
Figure 2C:
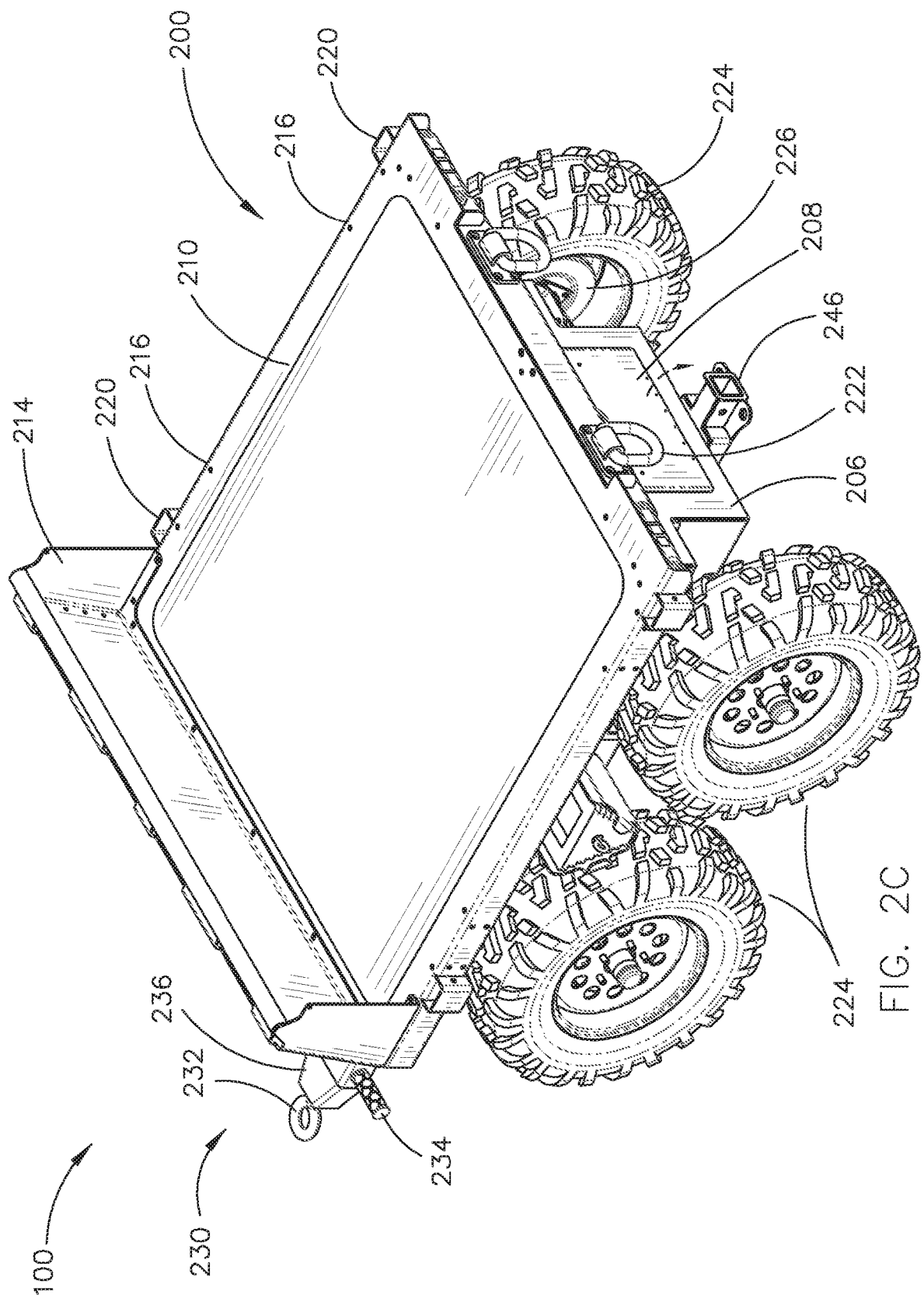
FIG. 2C illustrates a perspective view of a trailer including an articulating trailer tongue, in accordance with one or more embodiments of the present disclosure.
Figure 2D:
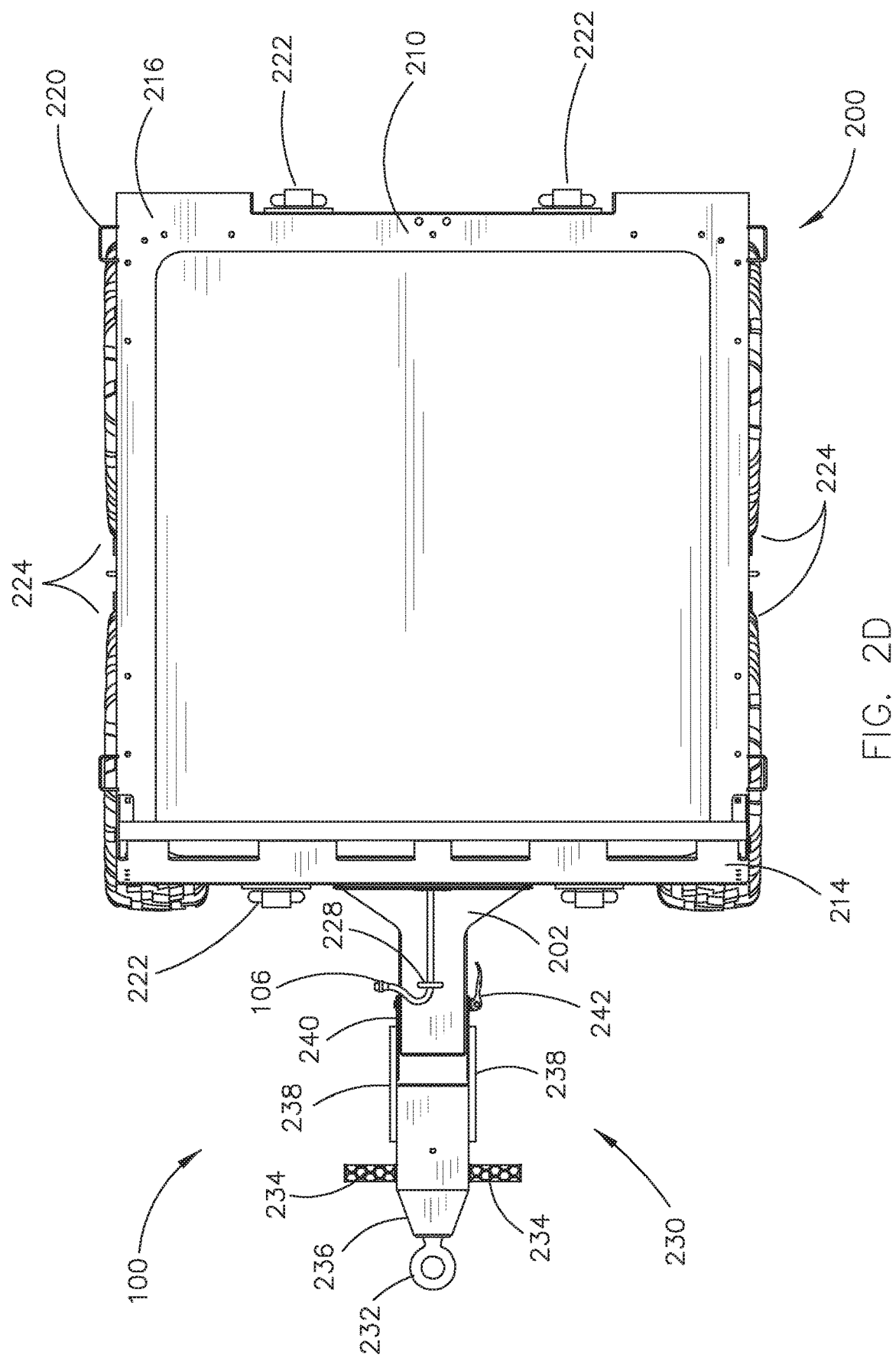
FIG. 2D illustrates a top view of a trailer including an articulating trailer tongue, in accordance with one or more embodiments of the present disclosure.

FIGS. 1A and 1B generally illustrate the trailer 100, in accordance with one or more embodiments of the present disclosure.

In one embodiment, the trailer 100 is couplable to a vehicle 102. For example, the vehicle 102 may include, but is not limited to, a utility task vehicle (UTV), a recreational off-highway vehicle (ROV), a multipurpose off-highway utility vehicle (ROHUV), an all-terrain vehicle (ATV), a personal tracked vehicle (PTV), or the like. For instance, the vehicle 102 may include a military duty UTV. It is noted herein the vehicle 102 may include any side-by-side, three-wheeler, four-wheeler, six-wheeler, tracked vehicle, or mini tracked vehicle known in the art. By way of another example, the vehicle 102 may include, but is not limited to, any commercial vehicle, construction vehicle, military vehicle, or the like known in the art. For instance, the vehicle 102 may include a high mobility multi-purpose wheeled vehicle (HMMWV or Humvee).

In another embodiment, the trailer 100 is couplable to the vehicle 102 via a hitch. For example, the hitch may include a hitch positioned behind a rear axle of the vehicle 102 including a pintle hitch, a rear receiver hitch, a bumper hitch, a weight distribution hitch, or the like. In another embodiment, the vehicle 102 includes a hitch component 104. For example, the hitch component 104 may include a pintle hitch, such that the vehicle 102 includes a pintle hook. It is noted herein the hitch component 104 may include, but is not limited to, any pintle hook, ball, or combination pintle hook-and-ball known in the art. In another embodiment, the trailer 100 is couplable to the vehicle 102 via an electrical coupler 106. For example, the electrical coupler 106 may include, but is not limited to, a trailer connector (e.g., a 4-pin, 5-pin, 6-pin, or 7-pin trailer connector).

Although embodiments of the present disclosure are directed to the hitch component 104 coupled to the vehicle 102 as including a pintle hook, such that the trailer 100 and the vehicle 102 are coupled together via a pintle hitch, it is noted herein the hitch may instead be any type of hitch known in the art. Therefore, the above description should not be interpreted as a limitation on the present disclosure but merely an illustration.

FIGS. 2A-2D generally illustrate the trailer 100, in accordance with one or more embodiments of the present disclosure.

In one embodiment, the trailer 100 includes a trailer bed 200. In another embodiment, the trailer bed 200 includes a trailer frame 202. In another embodiment, the trailer frame 202 is fabricated from one or more beams. For example, the trailer frame 202 may be fabricated from one centered beam, with the trailer bed 200 extending in one or more directions from the centered beam. For instance, the trailer frame 202 may include one or more frame support members 204 set at an angle to the one or more beams. By way of another example, the trailer frame 202 may be fabricated from two or more beams. For instance, the two or more beams may be coupled together via one or more cross-members and/or one or more frame support members 204 set at an angle to the two or more beams. It is noted herein the two or more beams may be arranged in a side-by-side configuration (e.g., a left frame portion and a right frame portion) and/or in an at least partially stacked configuration (e.g., an upper frame portion and a lower frame portion).

In another embodiment, the trailer bed 200 includes a body 206. In another embodiment, the body 206 includes one or more portions of a selected width. For example, the body 206 may include one or more portions of a width equal to a width of a platform 210. By way of another example, the body 206 may include one or more portions of a width less than the width of the platform 210. By way of another example, the body 206 may include a first portion of a first width and at least an additional portion of at least an additional width.

In another embodiment, the body 206 includes one or more storage compartments 208. For example, the one or more storage compartments 208 may be sealed. For instance, the one or more storage compartments 208 may be water-resistant. By way of another example, the one or more storage compartments 208 may include a door. For instance, the one or more storage compartments 208 may include a door on zero, one, or both ends of the storage compartment 208. By way of another example, the body 206 may include one storage compartment 208 extending at least a portion (e.g., up to a full length and/or width) of the body 206. By way of another example, the body 206 may include two or more storage compartments 208. For instance, the two or more storage compartments 208 may be connected. In addition, the two or more storage compartments 208 may be at least partially separated by an internal wall. By way of another example, the body 206 may include one or more storage compartments 208 accessible from the front, rear, and/or side of the trailer 100.

In another embodiment, the trailer bed 200 includes the platform 210. For example, the trailer bed 200 may be fabricated from one or more sections. For instance, the one or more sections may be coupled to the trailer frame 202. In addition, the one or more sections may be planar or substantially planar. In another embodiment, the platform 210 is coupled to the body 206 via one or more platform support members 212. In another embodiment, the one or more platform support members 212 are coupled to a bottom surface of the platform 210. In another embodiment, the platform 210 includes one or more sidewalls, such that the one or more platform support members 212 are coupled to a recessed bottom surface of the platform 210 within the one or more sidewalls of the platform 210.

It is noted herein a top surface of the platform 210 may include one or more ridges, protrusions, coatings, or the like intended to serve as preventative measures against the movement of items loaded on the platform 210. In addition, it is noted herein the top surface of the platform 210 may include one or more tie-down, sling, or strap locations (e.g., one or more bolted-on hooks or rings, one or more embedded bars above a cut-out in the surface, or the like). Therefore, the above description should not be interpreted as a limitation on the present disclosure but merely an illustration.

In another embodiment, the platform 210 includes a guard 214. In another embodiment, the platform 210 includes one or more holes 216 in the top surface of the platform 210. In another embodiment, the platform 210 includes one or more holes 218 in one or more side surfaces and/or in the one or more sidewalls of the platform 210. In another embodiment, the platform 210 includes one or more post brackets 220 coupled to the top surface, the one or more side surfaces, and/or the one or more sidewalls of the platform 210.

In another embodiment, the trailer 100 is configured to couple to one or more accessories attachable to the trailer bed 200. For example, one or more mount points on the guard 214, the one or more holes 216, the one or more holes 218, and/or the one or more post brackets 220 may be configured to couple to the one or more accessories attachable to the trailer bed 200. By way of another example, the one or more accessories attachable to the trailer bed 200 may include, but are not limited to, one or more guide rails, one or more box walls, one or more tailgates, an enclosed topper including one or more sections, or the like.

In another embodiment, the trailer 100 includes one or more rings 222 coupled to the one or more side surfaces and/or the one or more sidewalls of the platform 210. For example, the one or more rings 222 may be configured to couple to one or more chain slings, straps, tie-downs, hooks, or the like. For instance, the one or more rings 222 may include, but are not limited to, one or more D-rings. In addition, the one or more rings 222 may be rated to meet and/or exceed one or more military duty standards (e.g., MIL-STD-209K).

In one embodiment, the trailer 100 includes two or more wheels 224. For example, the trailer 100 may include one or more sets of two wheels 224, with a wheel of the two wheels 224 on each side of the body 206 (e.g., a single rear wheel arrangement). For example, the trailer 100 may include two sets of two wheels 224, such that the trailer 100 has a total of four wheels 224. It is noted herein, however, that the trailer 100 may include one or more sets of four wheels 224, with two wheels of the four wheels 224 on each side of the body 206 (e.g., a dual rear wheel, or "dually", arrangement). Therefore, the above description should not be interpreted as a limitation on the present disclosure but merely an illustration.

In another embodiment, the two or more wheels 224 are designed for select duty and/or field usage. For example, the two or more wheels 224 may include, but are not limited to, bead lock tires. By way of another example, the two or more wheels 224 may include, but are not limited to, run-flat tires. By way of another example, the two or more wheels 224 may be rated to meet and/or exceed one or more military duty standards.

In another embodiment, the one or more sets of the two or more wheels 224 may be configured to fit under the platform 210, such that the platform 210 is planar or substantially planar. In another embodiment, the trailer 100 includes one or more wheel wells for the two or more wheels 224. For example, the trailer 100 may include a wheel well within the top surface of the platform 210 and over the two or more wheels 224. By way of another example, the trailer 100 may include additional panels of the body 206 surrounding the two or more wheels 224, where the one or more additional panels form the one or more wheel wells. Therefore, the above description should not be interpreted as a limitation on the present disclosure but merely an illustration.

In another embodiment, the two or more wheels 224 include one or more brakes 226. For example, the one or more brakes 226 may include one or more electric brakes (e.g., drum or disc) controllable by the vehicle 102 via the electric coupler 106 (e.g., a 4-pin, 5-pin, 6-pin, or 7-pin trailer connector). For instance, the one or more electric brakes may be powered by a weather-protected battery on-board the trailer 100. In addition, the one or more electrically-actuated brakes may be powered via the electric coupler 106. By way of another example, the one or more brakes 226 may include one or more hydraulically-actuated brakes. By way of another example, the one or more brakes 226 may include one or more mechanically-actuated brakes.

In another embodiment, the trailer 100 includes a cable guide 228 for the electric coupler 106. For example, the cable guide 228 may be coupled to one or more of the trailer frame 202, the body 206, and/or the platform 210. By way of another example, an electrical cable coupled to the electric coupler 106 may be passed through the cable guide 228. For instance, the cable guide 228 may include, but is not limited to, a ring coupled to a rigid rod, where the electrical cable coupled to the electric coupler 106 is passed through the ring.

In one embodiment, the trailer 100 includes a trailer tongue 230. In another embodiment, the trailer tongue 230 includes a hitch component 232. For example, the hitch component 230 may include a lunette ring and the hitch component 104 may include a pintle hook for a pintle hitch, where the lunette ring is couplable to the pintle hook. By way of another example, the hitch component 232 may include a ball receiver for a ball hitch, where the ball receiver is couplable to a ball. It is noted herein the hitch component 232 may include a component for any hitch positioned behind a rear axle.

In another embodiment, the trailer tongue 230 includes one or more handles 234 configured to assist in moving the trailer 100. In another embodiment, trailer tongue 240 includes one or more loops configured to couple to a set of chains or safety cables.

In another embodiment, the hitch component 232 and the one or more handles 234 are coupled to a tongue arm 236. In another embodiment, the tongue arm 236 is coupled to the trailer frame 202 via one or more linkages 238. For example, the one or more linkages 238 may be coupled to the tongue arm 236 and the trailer frame 202 such that a gap including a selected width is present between the tongue arm 236 and the trailer frame 202. In this regard, the trailer tongue 230 (e.g., the tongue arm 236 of the trailer tongue 230) may be set a selected distance from an end of the trailer frame 202 via the one or more linkages 238.

In another embodiment, the one or more linkages 238 are coupled to one or more bracket plates 240. For example, the one or more linkages 238 may be coupled to the one or more bracket plates 240 and the tongue arm 236. For instance, the one or more linkages 238 may be coupled to the tongue arm 236 and/or the one or more bracket plates 240 via one or more welds, fasteners, or the like. By way of another example, the one or more linkages 238 may be coupled to the one or more bracket plates 240 at an end of the one or more linkages 238 proximate to the trailer frame 202.

In another embodiment, a bracket shaft (e.g., rod, bolt, axle, or the like) passes through the trailer frame 202 and one or more components of the trailer tongue 230. For example, the bracket shaft may pass through the one or more bracket plates 240 and the one or more linkages 238. By way of another example, the bracket shaft may pass through the one or more bracket plates 240. In another embodiment, the trailer tongue 230 is configured to rotate about an axis through the bracket shaft. For example, the tongue arm 236, the one or more linkages 238, and the one or more bracket plates 240 may be configured to rotate as a single component about the bracket shaft. It is noted herein, however, that the tongue arm 236, the one or more linkages 238, and the one or more bracket plates 240 may be configured for independent rotation about the axis through the bracket shaft and an additional axis. Therefore, the above description should not be interpreted as a limitation on the scope of the present disclosure, but merely an illustration.

In another embodiment, the one or more bracket plates 240 include one or more cut-outs 242. For example, the one or more cut-outs 242 may be formed from a continuous cut-out in the one or more bracket plates 240. For instance, the continuous cut-out may be a curved slot, such that the one or more bracket plates 240 are able to rotate about the axis through the bracket shaft. By way of another example, the one or more cut-outs 242 may be formed from a cut-out including two or more sections, a series of spaced holes (e.g., patterned or un-patterned), or the like that substantially map to a curved slot.

Although embodiments of the present disclosure are directed to the one or more cut-outs 242 being (or substantially mapping to) a curved slot, it is noted herein that the one or more cut-outs 242 may be (or may substantially map to) a straight slot. However, it is noted herein this may require the one or more bracket plates 240 and/or the one or more linkages 238 to be coupled to the bracket coupler via a parallel (or substantially parallel) additional straight slot. Therefore, the above description should not be interpreted as a limitation on the scope of the present disclosure, but merely an illustration.

In another embodiment, a locking component 244 passes through the one or more cut-outs 242 and the trailer frame 202. For example, the locking component 244 may include, but is not limited to, a quick-release skewer assembly (e.g., an assembly including a skewer, a nut, and a quick-release lever, or the like). By way of another example, the locking component 244 may include, but is not limited to, a cam lock. By way of another example, the locking component 244 may include, but is not limited to, a lock bar of a padlock or combination lock, or the like. By way of another example, the locking component 244 may include, but is not limited to, a hitch pin and cotter pin assembly (e.g., hairpin cotter pin, bowtie cotter pin, cotter ring/split ring, kickout ring, split pin, or the like), a locking pin (e.g., a square wire locking pin or a round wire locking pin), a clevis pin (with cotter pin, hairpin, split pin, or the like), a hitch pin, a quick-release pin, or the like. By way of another example, the locking component 244 may include, but is not limited to, a bolt and nut (e.g., hex nut, lock nut, wing nut, or the like) assembly, or the like. It is noted herein the locking component 244 may include, but is not limited to, any locking component known in the art.

In another embodiment, the locking component 244 secures the trailer tongue 230 at a select angle relative to a ground surface when engaged. In another embodiment, securing the trailer tongue 230 at the select angle via the locking component 244 allows the hitch component 232 (e.g., lunette ring) to be positioned at a select height relative to a height of a corresponding hitch component 104 (e.g., a pintle hook) coupled to the vehicle 102. For example, the select height may be defined based on the angle of the trailer tongue 230 relative to the ground surface. By way of another example, the angle of rotation may range from where the trailer tongue 230 makes contact with the ground surface at an angle below zero (e.g., horizontal with the ground surface), to where the trailer tongue 230 makes contact with the trailer bed 200 at an angle above zero. For instance, the angle of rotation may range from −15 degrees to 120 degrees.

Figure 3A:
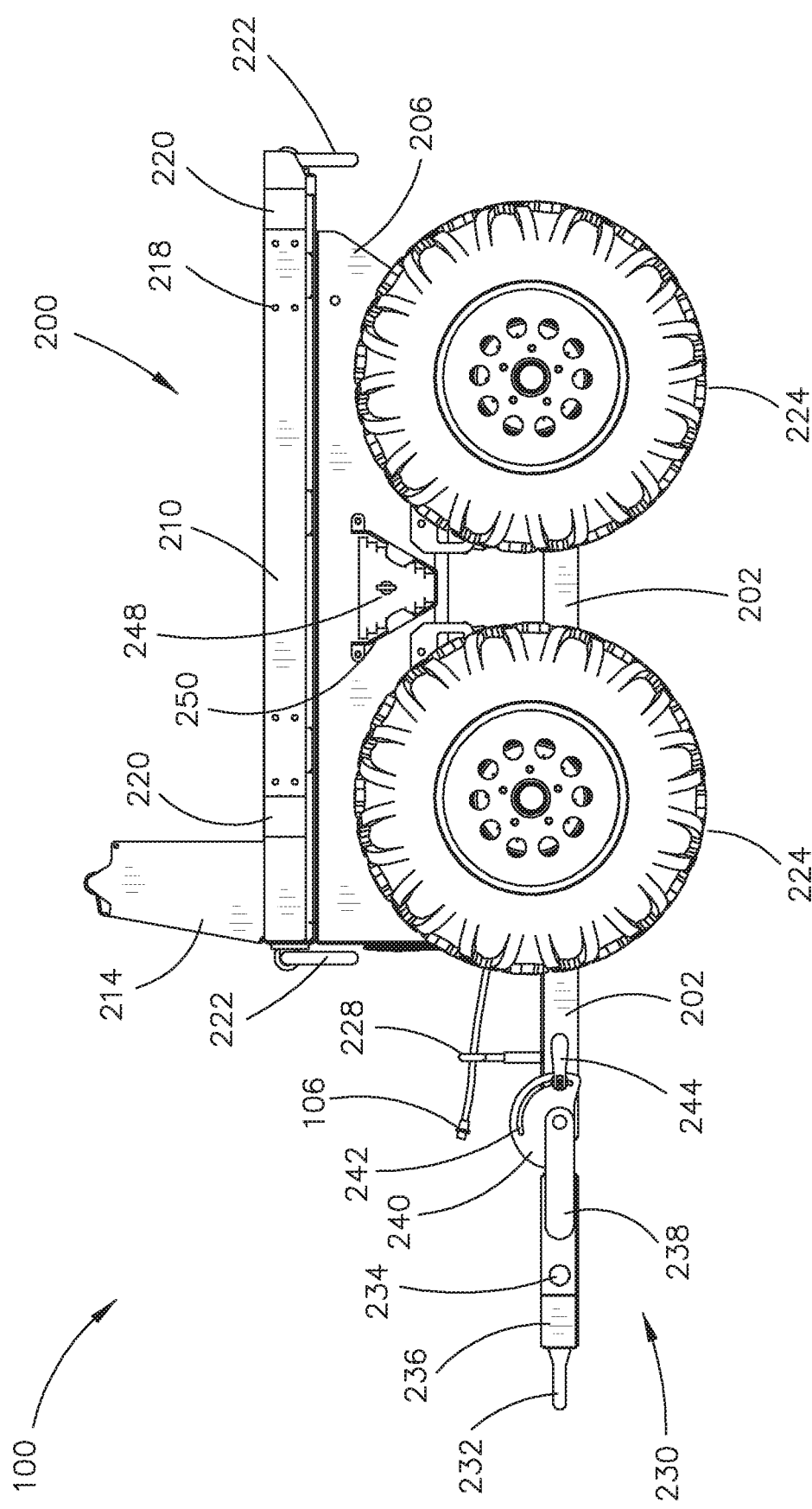
FIG. 3A illustrates a side view of a trailer including an articulating trailer tongue, in accordance with one or more embodiments of the present disclosure.
Figure 3B:
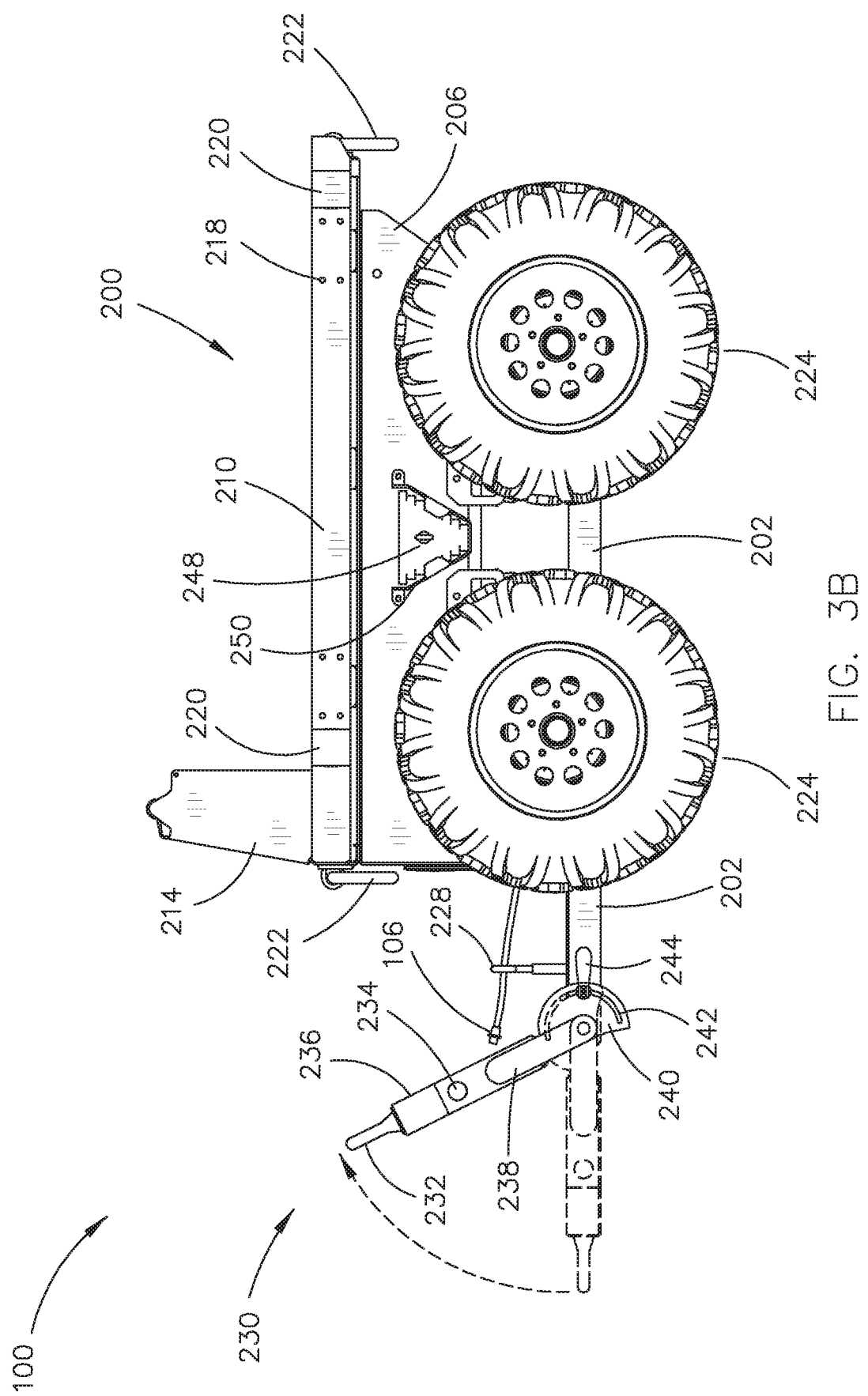
FIG. 3B illustrates a side view of a trailer including an articulating trailer tongue, in accordance with one or more embodiments of the present disclosure.
Figure 3C:
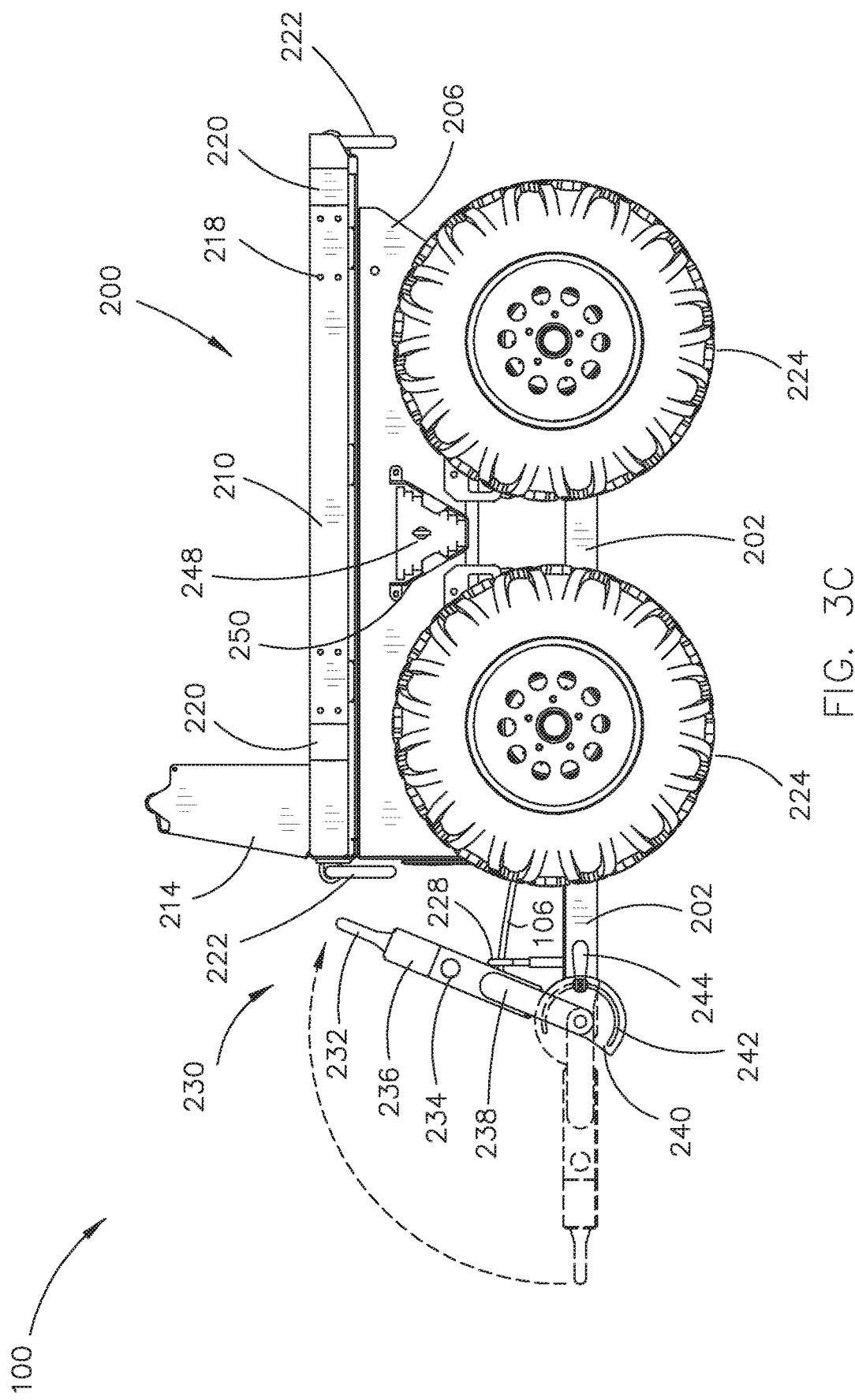
FIG. 3C illustrates a side view of a trailer including an articulating trailer tongue, in accordance with one or more embodiments of the present disclosure.
Figure 4A:
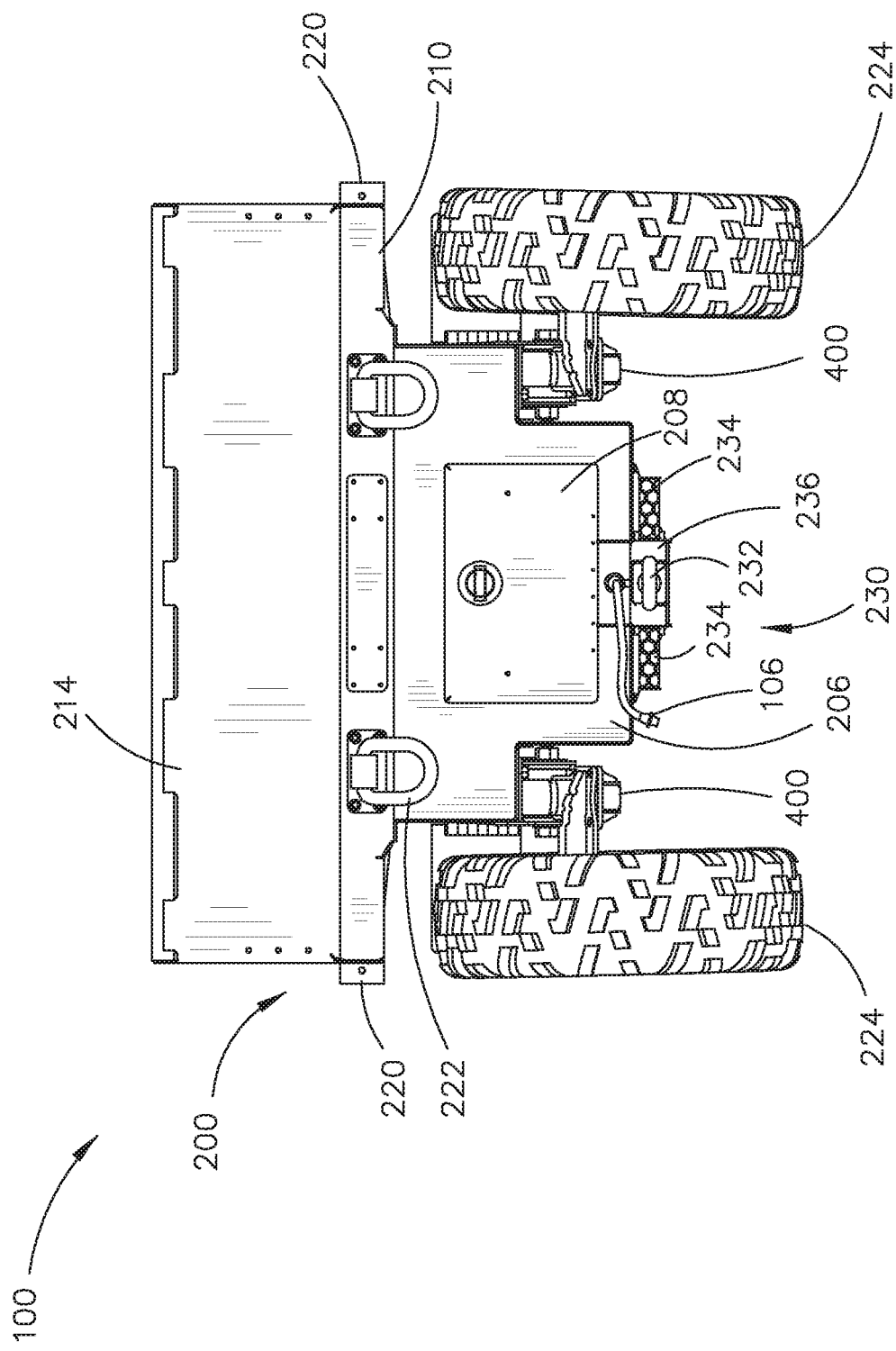
FIG. 4A illustrates a front view of a trailer including an articulating trailer tongue, in accordance with one or more embodiments of the present disclosure.
Figure 4B:
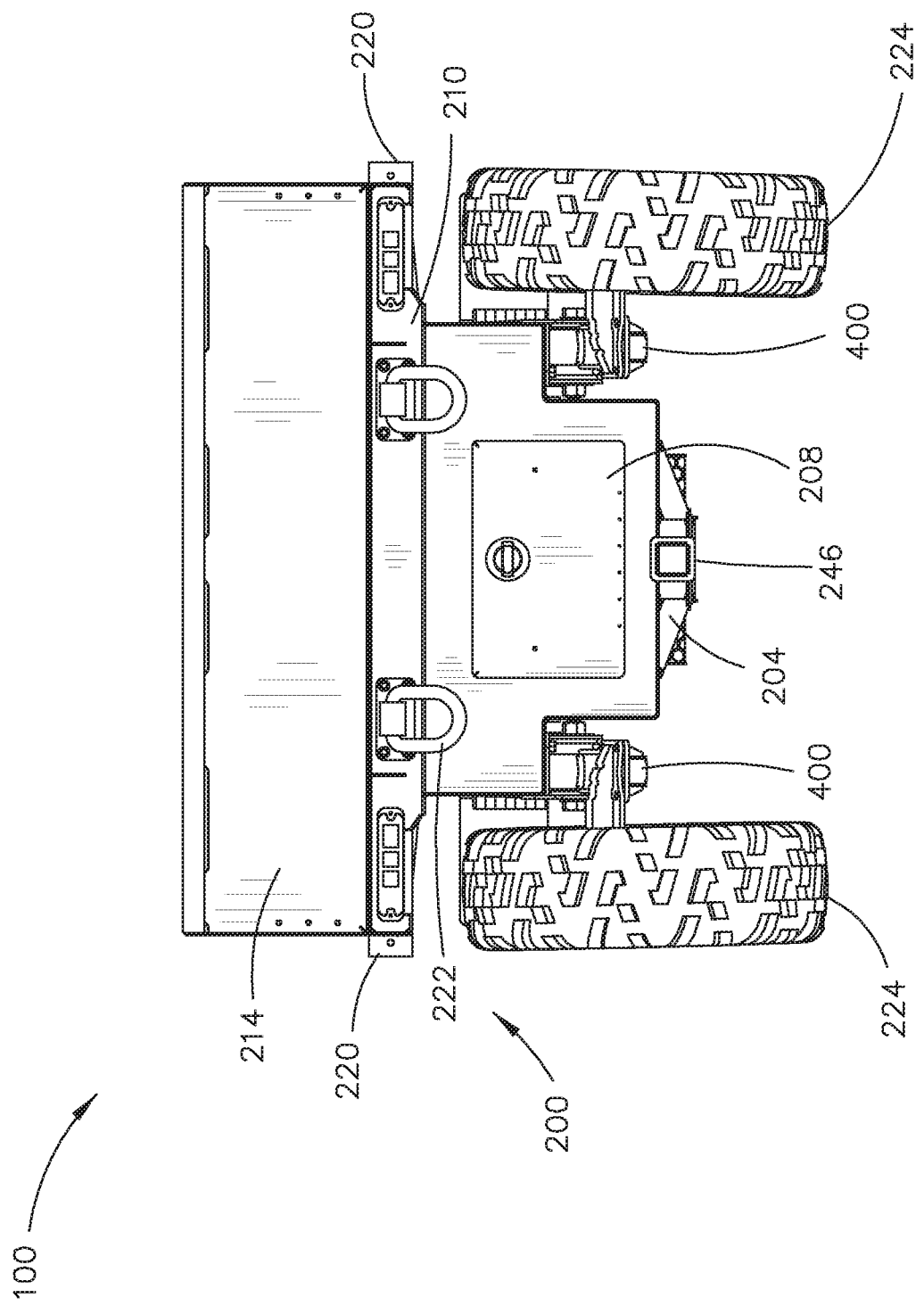
FIG. 4B illustrates a rear view of a trailer including an articulating trailer tongue, in accordance with one or more embodiments of the present disclosure.
Figure 4C:
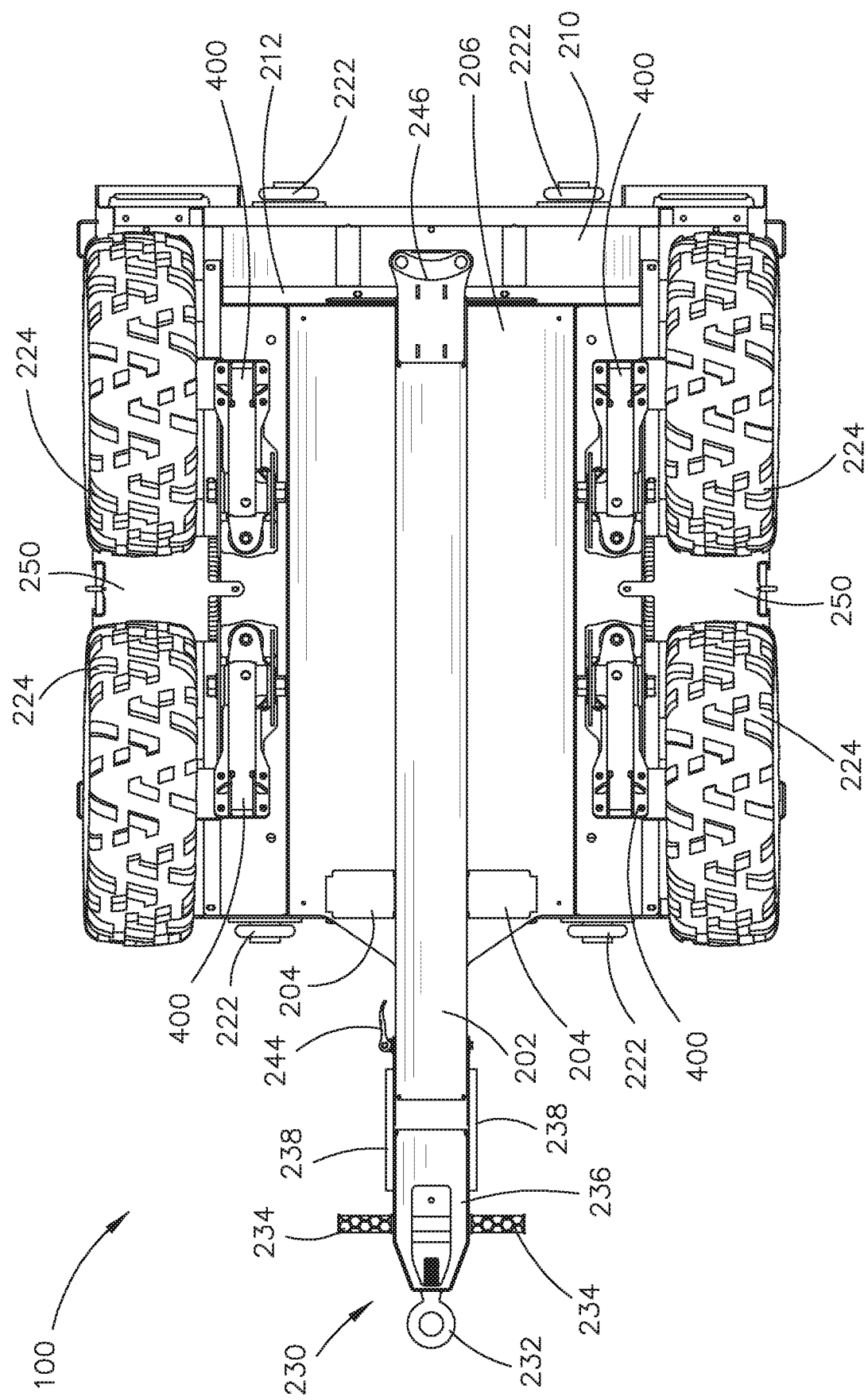
FIG. 4C illustrates a bottom view of a trailer including an articulating trailer tongue, in accordance with one or more embodiments of the present disclosure.
Figure 4D:
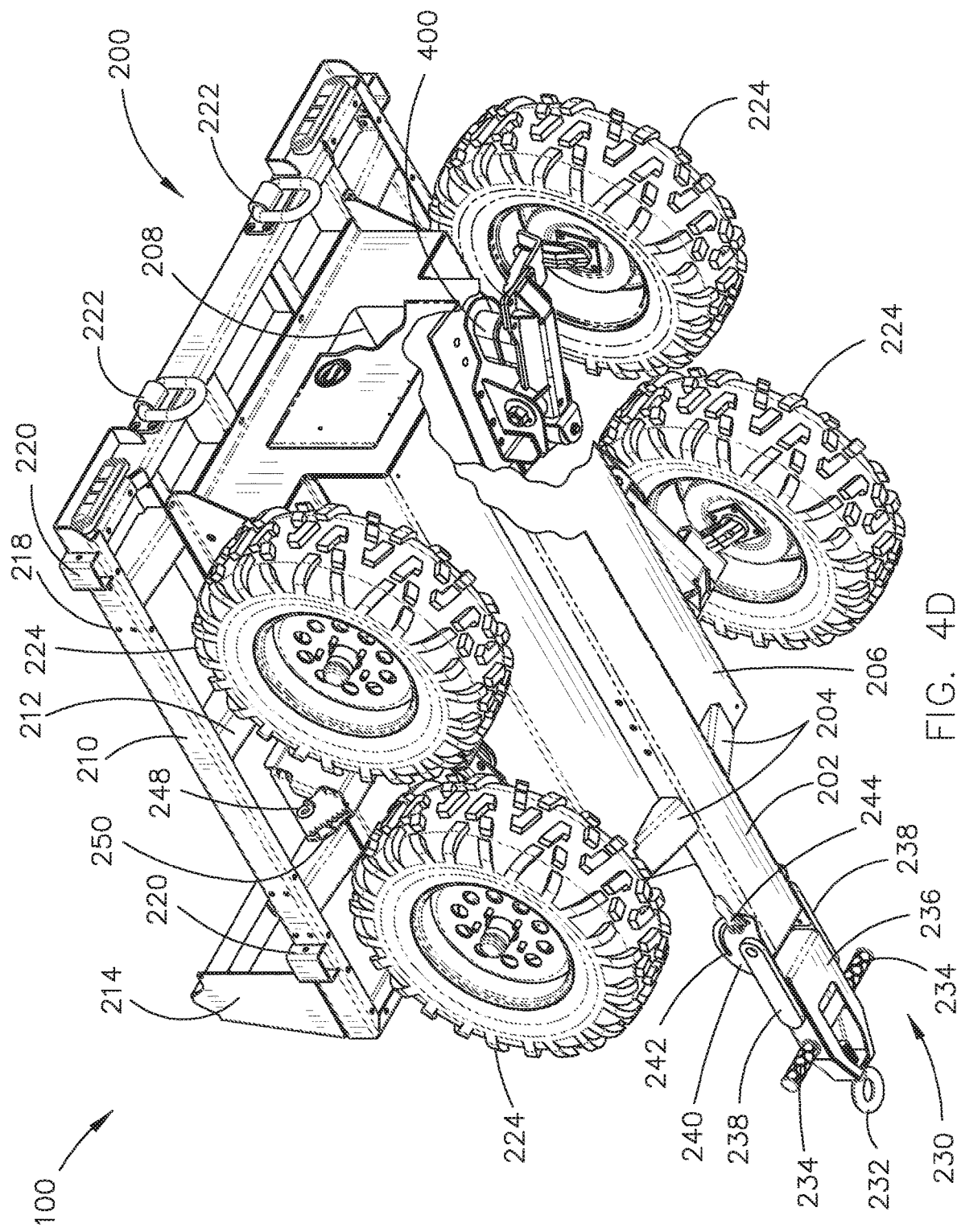
FIG. 4D illustrates a perspective view with a cut-out section of a trailer including an articulating trailer tongue, in accordance with one or more embodiments of the present disclosure.

FIGS. 3A-3C generally illustrate the operation of the trailer tongue 230, in accordance with one or more embodiments of the present disclosure.

In one embodiment, the trailer tongue 230 is parallel or substantially parallel to the ground surface when the locking component 244 engages the one or more bracket plates 240 at one end of the one or more cut-outs 242. In another embodiment, the trailer tongue 230 is securable at a select angle relative to the ground surface when the locking component 244 engages the one or more bracket plates 240 at one end of the one or more cut-outs 242, up to a maximum angle where the locking component 244 engages the one or more bracket plates 240 at an opposite end of the one or more cut-outs 242.

It is noted herein that the trailer 100 is not limited to the select angles relative to the ground surface as illustrated in FIGS. 3A-3C, but that the trailer tongue 230 is securable based on where the locking component 244 engages the one or more bracket plates 240 at any position along the one or more cut-outs 242. Therefore, the above description should not be interpreted as a limitation on the scope of the present disclosure, but merely an illustration.

In another embodiment, securing the trailer tongue 230 at a select angle relative to the ground surface positions the hitch component 232 at a select height relative to a height of the hitch component 104. For example, the hitch component 104 may be coupled to the vehicle 102. By way of another example, the hitch component 104 may be coupled to an additional trailer 100 ahead in a chain (or train) of trailers 100.

It is noted herein that positioning the hitch component 232 at the select height reduces a select amount of downforce applied to the vehicle hitch component 104 via the trailer tongue 230 (e.g., reduces an amount of weight transfer from the trailer tongue 230 on the vehicle hitch component 104). In this regard, neither the tongue weight capacity nor the vehicle hitch component weight capacity is a limiting factor on the towing capability of the trailer 100, as there is zero tongue weight, such that the vehicle 102 may tow an amount of weight closer to the maximum rated towing capacity of the trailer 100 (e.g., the maximum rated hauling capacity of the trailer 100 per axle, minus the trailer 100 weight).

In addition, it is noted herein that although the maximum tongue weight of the trailer 100 may be less than the maximum rated towing capacity of the vehicle 102, the maximum rated hauling capacity of the trailer 100 may be greater than the maximum rated towing capacity of the vehicle 102. In this regard, the trailer 100 including an articulating zero-tongue-weight trailer tongue 230 allows the maximum rated towing capacity of the vehicle 102 to be implemented when hauling.

Referring again to FIGS. 2A-2D, in one embodiment the trailer 100 includes a hitch component 246. For example, the hitch component 246 may include, but is not limited to, a hitch receiver for a ball or a plug-in pintle hook, a mounted ball or pintle hook, or the like. It is noted herein the hitch component 246 may include a component for any hitch positioned behind a rear axle. In this regard, the trailer 100 may be coupled to one or more additional trailers 100 in the chain (or train) formation.

In another embodiment, the trailer 100 includes one or more wheel chocks 248 stowed in one or more chock holders 250. For example, the one or chock holders 250 may be coupled to the trailer frame 202, an exterior surface of the body 206, within the one or more storage compartments 208, and/or on the platform 210.

In another embodiment, the trailer 100 includes one or more mud flaps. For example, the one or more mud flaps may be coupled to the body 206 and/or the platform 210. For instance, the one or more mud flaps may be coupled directly to the body 206 and/or the platform 210. In addition, the one or more mud flaps may be coupled to the body 206 and/or the platform 210 via a bracket assembly.

In another embodiment, the trailer 100 includes one or more electrical accessories. For example, the trailer 100 may include, but is not limited to, one or more lights. For instance, the one or more lights may include, but are not limited to, one or more brake lights coupled to the one or more brakes 226. In addition, the one or more lights may include, but are not limited to, one or more headlights, one or more side lights, one or more running lights, one or more utility lights, one or more spot lights, one or more work lights, or the like. Further, the trailer 100 may include, but is not limited to, one or more electrical couplers for one or more lights. By way of another example, the trailer 100 may include, but is not limited to, one or more power couplers such as 120-volt alternating current (AC) outlets, 12-volt direct current (DC) ports, or the like. By way of another example, the trailer 100 may include, but is not limited to, one or more computer connectors such as one or more universal serial bus (USB) ports, or the like.

In another embodiment, the one or more electrical accessories are powered by one or more on-board batteries. For example, the one or more on-board batteries may be charged via a solar charger, the electrical coupler 106, or the like. It is noted herein, however, that the one or more electrical accessories may be directly wired to the electrical coupler 106. Therefore, the above description should not be interpreted as a limitation on the scope of the present disclosure, but merely an illustration.

FIGS. 4A-4D generally illustrate the trailer 100, in accordance with one or more embodiments of the present disclosure.

In one embodiment, the two or more wheels 224 are coupled to the trailer 100 via one or more axle components and/or one or more suspension components. For example, the two or more wheels 224 are coupled to the trailer frame 202, the body 206, the platform 210, and/or the one or more platform support members 212 via the one or more axle components and/or the one or more suspension components. For instance, the two or more wheels 224 may be coupled to the trailer 100 via an independent suspension member 400 that allows the wheel 224 to independently flex when traversing over terrain to help to stabilize the platform 210. In addition, the independent suspension member 400 may allow the two or more wheels 224 to be positioned underneath the platform 210. In this regard, the one or more compartments 208 within the body 206 may be of larger size than if the two or more wheels 224 were coupled together via a solid axle.

It is noted herein, however, that the suspension components may be coupled together, such that fully independent flexing is not possible. For example, the trailer frame 202 may include one or more axle components for the two or more wheels 224 to be coupled together via a solid axle (e.g., brackets, bearings, leaf springs, shocks, struts, or the like). Therefore, the above description should not be interpreted as a limitation on the scope of the present disclosure, but merely an illustration.

In one embodiment, one or more components of the trailer 100 is fabricated from a metal. For example, one or more components of the trailer 100 may be fabricated from aluminum. For instance, one or more components of the trailer bed 200 (e.g., the trailer frame 202, the body 206, or the like), the trailer tongue 230, or the one or more accessories attachable to the trailer bed 200 may be fabricated from aluminum. By way of another example, one or more components of the trailer 100 may be fabricated from steel. For instance, one or more components of the trailer bed 200, the trailer tongue 230, or the one or more accessories attachable to the trailer bed 200 may be fabricated from steel. It is noted herein one or more components of the trailer 100 may be fabricated from any metal known in the art.

Advantages of the present disclosure include a trailer including an articulating trailer tongue, where the trailer tongue is configured for zero tongue weight. Advantages of the present disclosure also include hauling the trailer via a hitch coupled to a vehicle. Advantages of the present disclosure also include an articulatable trailer tongue, where a height of a hitch component coupled to the trailer tongue is configurable relative to a height of a hitch component coupled to the vehicle.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality.

Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

What is claimed:

1. A trailer, comprising:
   a trailer bed, comprising:
      a trailer frame;
      a body coupled to the trailer frame;
      a platform coupled to the body; and
      four wheels separated into two sets of two wheels; and
   a trailer tongue coupled to the trailer frame, comprising:
      a tongue arm;
      a trailer hitch component coupled to the tongue arm, wherein the hitch component of the trailer tongue is couplable to a utility task vehicle (UTV) hitch component;
      one or more linkages fixed to the tongue arm; and
      one or more brackets coupled to the trailer frame via a bracket shaft, wherein the tongue arm is coupled to the one or more brackets via the one or more linkages, wherein the one or more brackets are rotatable about an axis through the bracket shaft between a first position of a plurality of positions and at least a second position of the plurality of positions, wherein a first position angle defined by the tongue arm and the one or more linkages when the one or more brackets are in the first position is the same as a second position angle defined by the tongue arm and the one or more linkages when the one or more brackets are in the at least the second position,
      wherein the one or more brackets include one or more continuous cut-outs, wherein the one or more continuous cut-outs are configured to receive a locking component,
      wherein the trailer tongue is securable via the locking component at a select angle relative to a ground surface at a plurality of locations along the one or more continuous cut-outs,
      wherein the trailer hitch component is positionable via the locking component at each of the plurality of locations along the one or more continuous cut-outs, wherein each of the plurality of locations corresponds to at a select height relative to a height of the UTV hitch component based on the angle relative to the ground surface,
      wherein the four wheels and the positioning of the trailer hitch component via the locking component at each of the plurality of locations along the one or more continuous cut-outs results in a zero tongue weight and removes both tongue weight capacity and UTV hitch component weight capacity as a limiting factor on a towing capability of the trailer.

2. The trailer in claim 1, wherein the positioning the trailer hitch component at the select height relative to the height of the UTV hitch component reduces an amount of downforce applied to the UTV hitch component via the trailer tongue.

3. The trailer in claim 1, wherein the UTV hitch component is a first vehicle hitch component, wherein the trailer hitch component is couplable to the first vehicle hitch component when the trailer tongue is secured in a first position, wherein the trailer tongue is couplable to an additional vehicle hitch component when the trailer tongue is secured in an additional position of the plurality of positions, wherein the trailer tongue is rotatable about the axis through the bracket shaft between the first position and the additional position.

4. The trailer in claim 1, wherein the hitch component of the tongue arm includes a lunette ring, wherein the UTV hitch component includes a pintle hook.

5. The trailer in claim 1, wherein the one or more continuous cut-outs includes a curved slot.

6. The trailer in claim 1, wherein the locking component passes through the one or more continuous cut-outs and the trailer frame.

7. The trailer in claim 1, wherein the tongue arm is set a selected distance from an end of the trailer frame via the one or more linkages.

8. The trailer in claim 1, wherein the locking component comprises at least one of a cam lock or a quick-release skewer assembly.

9. The trailer in claim 1, wherein the two sets of two wheels are coupled to the platform via one or more independent suspension members, wherein a first wheel of each set of the two sets of two wheels is configured for independent suspension travel relative to an additional wheel of each set of the two sets of two wheels.

10. The trailer in claim 1, wherein the two sets of two wheels include one or more brakes.

11. The trailer in claim 10, wherein the one or more brakes are electric, wherein the one or more electric brakes are controllable via an electric coupler couplable to the vehicle.

12. The trailer in claim 11, wherein the trailer bed includes a cable guide, wherein an electrical cable coupled to the electrical coupler is passed through the cable guide.

13. The trailer in claim 12, wherein the cable guide includes a ring coupled to a rigid rod, wherein the cable guide is coupled to the trailer frame.

14. The trailer in claim 1, wherein the platform including one or more rings, wherein the one or more rings are configured to couple to one or more chain slings, straps, tie-downs, or hooks.

15. The trailer in claim 1, wherein the body includes one or more compartments.

16. The trailer in claim 1, wherein a hitch receiver is coupled to a rear end of the trailer frame.

17. The trailer in claim 1, further comprising one or more wheel chock holders configured to receive one or more wheel chocks.

18. The trailer in claim 17, wherein the one or more wheel chock holders are mounted to a side of the body between the two wheels of one set of the two sets of two wheels.

19. A zero-tongue-weight trailer tongue, comprising:
a tongue arm;
a trailer hitch component coupled to the tongue arm, wherein the hitch component of the trailer tongue is couplable to a utility task vehicle (UTV) hitch component;
one or more linkages fixed to the tongue arm; and
one or more brackets coupled to a trailer frame of a trailer including four wheels via a bracket shaft, wherein the tongue arm is coupled to the one or more brackets via the one or more linkages, wherein the one or more brackets are rotatable about an axis through the bracket shaft between a first position of a plurality of positions and at least a second position of the plurality of positions, wherein a first position angle defined by the tongue arm and the one or more linkages when the one or more brackets are in the first position is the same as a second position angle defined by the tongue arm and the one or more linkages when the one or more brackets are in the at least the second position,
wherein the one or more brackets include one or more continuous cut-outs, wherein the one or more continuous cut-outs are configured to receive a locking component,
wherein the trailer tongue is securable via the locking component at a select angle relative to a ground surface at any location along the one or more continuous cut-outs,
wherein the trailer hitch component is positionable via the locking component at each of the plurality of locations along the one or more continuous cut-outs, wherein each of the plurality of locations corresponds to at a select height relative to a height of the UTV hitch component based on the angle relative to the ground surface,
wherein the four wheels and the positioning of the trailer hitch component via the locking component at each of the plurality of locations along the one or more continuous cut-outs results in a zero tongue weight and removes both tongue weight capacity and UTV hitch component weight capacity as a limiting factor on a towing capability of the trailer.

* * * * *